Dec. 7, 1943.  G. E. DATH  2,335,847
FRICTION SHOCK ABSORBING MECHANISM
Filed Oct. 6, 1941
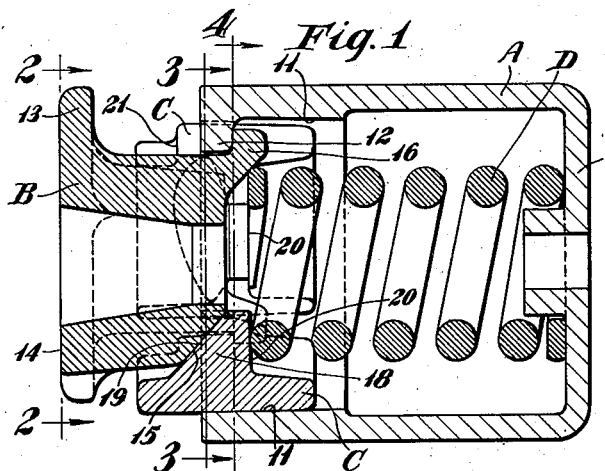
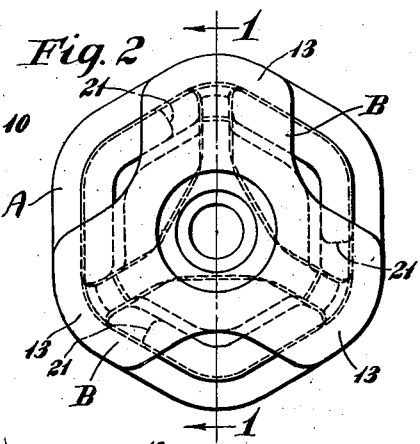
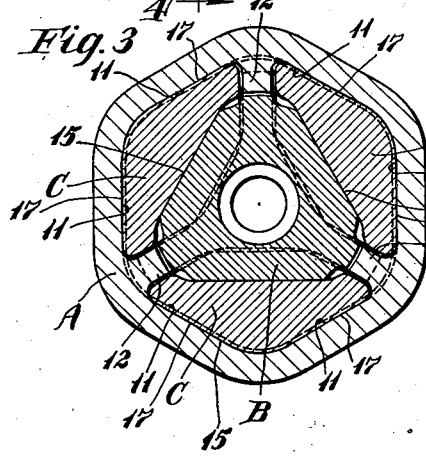
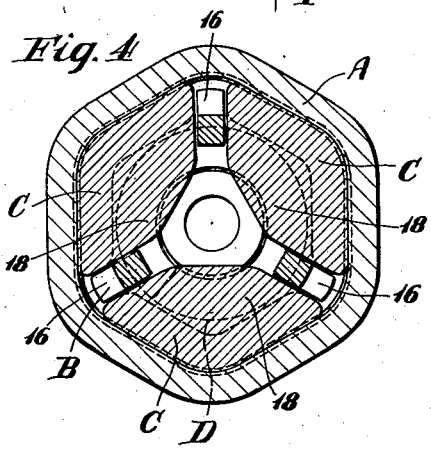
Inventor
George E. Dath
By Henry Fuchs
Atty.

Patented Dec. 7, 1943

2,335,847

UNITED STATES PATENT OFFICE 2,335,847

FRICTION SHOCK ABSORBING MECHANISM

George E. Dath, Mokena, Ill., assignor to W. H. Miner, Inc., Chicago, Ill., a corporation of Delaware Application October 6, 1941, Serial No. 413,792

7 Claims. (Cl. 267—9)

This invention relates to improvements in friction shock absorbing mechanisms.

The main object of the invention is to provide a friction shock absorbing mechanism comprising a friction casing, a friction clutch having sliding frictional engagement with the casing, and spring resistance means yieldingly opposing movement of the clutch inwardly of the casing, wherein the clutch includes a central wedge block and friction shoes surrounding the block, and the parts of the mechanism are held assembled by shouldered engagement of the wedge with the casing, outward movement of the wedge thus being limited and the wedge, in turn, limiting outward movement of the shoes by engagement therewith.

A more specific object of the invention is to provide a friction shock absorbing mechanism comprising a friction casing open at its front end only, and having interior friction surfaces, a plurality of friction shoes having sliding frictional engagement with the friction surfaces of the casing, spring means within the casing opposing inward movement of the shoes, and a wedge block having wedging engagement with the shoes to spread the same apart, wherein the wedge is provided with retaining lugs adapted to engage shoulders on the casing to limit outward movement of the wedge and wherein the parts are so designed that the wedge, shoes and spring resistance may be assembled with the casing by entering the same through the open front end of the casing, thereby making it possible to use a one-piece casing structure having the rear end closed by a permanent wall member integral with the casing side walls.

Other objects of the invention will more clearly appear from the description and claims hereinafter following.

In the drawing forming a part of this specification Figure 1 is a longitudinal sectional view through a friction shock absorbing mechanism illustrating my improvements in connection therewith, said view corresponding substantially to the line 1—1 of Figure 2. Figure 2 is a front end elevational view of Figure 1, as indicated by the arrows 2—2 of Figure 1. Figures 3 and 4 are transverse sectional views, corresponding respectively to the lines 3—3 and 4—4 of Figure 1.

As shown in said drawing my improved friction shock absorbing mechanism comprises broadly a combined frictional shell and spring cage A, a wedge B having anchoring means in shouldered engagement with the combined shell and cage A; three friction shoes C—C—C; and a spring resistance D.

The combined shell and cage A is in the form of a casing of substantially hexagonal cross-section, having the friction shell section formed at the forward end and the spring cage section at the rear end thereof. The casing A is closed at the rear end by a transverse wall 10 formed integral with the side walls thereof. The friction shell section of the casing is provided with six interior, substantially flat, inwardly converging friction surfaces 11 which are spaced symmetrically about the central longitudinal axis of the mechanism. The friction surfaces 11 are arranged in pairs, the adjacent surfaces of each pair together forming a friction face of V-shaped transverse contour. At the open outer end the casing A is provided with three internal stop lugs 12—12—12 which are alternated with the three pairs of friction surfaces 11—11, the same being located between adjacent of said V-shaped friction faces which are formed by the pairs of surfaces 11—11.

The wedge B is in the form of a block having three radially projecting, equally spaced, circumferential flanges 13—13—13 at its outer end. The outer faces of the flanges 13 lie in the same plane as the outer end of the block and together with said outer end form a flat surface 14 lying in a single plane. At the inner end portion thereof the block B is provided with three flat wedge faces 15—15—15, arranged symmetrically about the longitudnial central axis of the wedge. The three faces 15 converge inwardly or rearwardly of the mechanism. Rearwardly of the wedge faces 15 the block B has three laterally outwardly projecting radial lugs 16—16—16, which are alternated with the wedge faces as clearly shown in Figure 4. In other words, the lugs 16 are so arranged that they are located between adjacent wedge faces and extend between adjacent shoes C to engage in back of the lugs 12 of the casing and restrict outward movement of the wedge.

The three friction shoes C—C—C are of similar design, each shoe having an outer, longitudinally extending V-shaped friction face formed by two adjacent angularly arranged friction surfaces 17—17 which are adapted to cooperate with one of said pairs of friction surfaces 11—11, and are correspondingly inclined to said surfaces 11—11. On the inner side each shoe C is provided with an enlargement 18, having a flat wedge face 19 thereon engaging with one of the faces 15 of the block B and correspondingly inclined thereto. The inner ends of the enlargements 18 of the shoes present flat transverse abutment faces 20 on which the spring resistance D is adapted to bear. At the forward end portion of each shoe C, one side edge thereof is notched or cut away as indicated at 21 to provide clearance to facilitate application of the wedge B to the shock absorbing mechanism in the assembling operation as hereinafter pointed out. As shown most clearly in Figure 2 the cut away portions are on corresponding side edges of the shoes and each cut away portion is of a width slightly greater than the width of one of the lugs 16 of the wedge B.

The spring resistance D, as shown, comprises a single coil bearing at its front end on the rear faces 20 of the enlargements 18 of the shoes, and bearing at its rear end on the rear wall 10 of the casing A. This spring is preferably under slight initial compression.

In assembling the mechanism, the spring D is first placed within the casing A. The shoes C—C—C are then assembled with the casing and are forced inwardly until the recessed sections 21 thereof pass inwardly beyond the lugs 12 of the casing to a position wherein the lugs 16 of the wedge B will pass freely between the lugs 12 and the inner end walls of said recesses 21.

With the shoes held in this position the wedge B is inserted between the shoes C—C—C by first aligning the lugs 16 of the wedge B with the notches 21 of the shoes, then pushing the wedge inwardly until the lugs 16 are disposed inwardly and clear of the lugs 12 of the casing, and then giving the wedge a partial rotation to the right as viewed in Figure 2, to bring the lugs 16 in back of the lugs 12 in aligned position with the latter. In this position of the wedge B the wedge faces 15 thereof are in registration with the faces 19 of the shoes to flatly engage the latter. When the parts have been brought to this position the shoes are freed so that the spring forces the shoes to their outermost position, thereby locking the wedge against rotation, the lugs 16 of the wedge being confined against rotary movement between adjacent shoes and held aligned with the lugs 12 of the casing to engage the latter and lock the wedge against outward movement.

The operation of my improved shock absorbing mechanism is as follows, upon inward movement of the wedge B with respect to the casing A, being produced due to compression of the mechanism, the spring resisted friction shoes are wedged apart and carried inwardly of the mechanism compressing the spring D thus producing high frictional resistance between the friction surfaces of the shoes and the casing. Upon the actuating force being reduced the expansive action of the spring returns all of the parts to the normal position shown in Figure 1, the wedge being limited in its outward movement by engagement of the lugs 16 thereof with the lugs 12 of the casing, and the shoes being, in turn, limited in their outward movement by the wedge.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing open at one end, said casing having circumferentially spaced, laterally inwardly projecting lugs at said open end; of a friction clutch cooperating with said casing; and a spring opposing inward movement of said clutch, said clutch including a wedge block and friction shoes surrounding said block, said block having radial lugs extending between adjacent shoes and into shouldered engagement with the lugs of said casing to limit outward movement of said block.

2. In a friction shock absorbing mechanism, the combination with a friction casing open at the front end and closed at its rear end, said casing having interior friction surfaces at said open end, said casing having inturned lugs at said open front end; of a wedge block having wedge faces, said block having laterally outwardly projecting lugs at its rear end engageable in back of the lugs of the casing to limit outward movement of the wedge, said wedge being rotatable about its longitudinal axis to bring the lugs thereof into and out of registration with the lugs of the casing; friction shoes surrounding said wedge, said shoes having friction surfaces engaging the casing friction surfaces, and wedge faces in wedging engagement with the wedge faces of said block; and means within the casing yieldingly opposing inward movement of the shoes.

3. In a friction shock absorbing mechanism, the combination with a friction casing open at its front end and closed by a transverse wall at the rear end, said casing having interior friction surfaces at said open end and a plurality of inturned retaining lugs at the front end of said friction surfaces; of a wedge block having wedge faces, said block having laterally outstanding lugs engaging in back of said lugs of the casing to restrict outward movement of the wedge; shoes interposed between the wedge and shell friction surfaces and having wedge faces engaging the wedge faces of said block, said lugs extending between adjacent shoes; and a spring within the casing interposed between the shoes and the rear wall of the casing, said spring yieldingly resisting movement of the shoes.

4. In a friction shock absorbing mechanism, the combination with a friction casing open at the front end and closed by a transverse wall at the rear end, said casing having interior friction surfaces at said open end, said casing having a plurality of inturned retaining lugs at said open end; of a wedge block having a plurality of outwardly extending retaining lugs corresponding in number to the lugs of the casing and engageable therewith; a plurality of friction shoes interposed between the wedge block and casing friction surfaces, said block and shoes having cooperating wedge faces, said lugs extending between adjacent shoes; and a spring within the casing yieldingly resisting movement of the shoes inwardly of the casing.

5. In a friction shock absorbing mechanism, the combination with a friction casing open at the front end, said casing having three interior friction surfaces, said casing having three inturned retaining lugs at the open end thereof, said lugs being disposed respectively between adjacent friction surfaces; of three friction shoes respectively engaging said friction surfaces, said shoes having wedge faces on their inner sides; a wedge block having three retaining lugs extending between adjacent friction shoes and engaging with the lugs of the casing to limit outward movement of the wedge, said wedge and shoes having cooperating wedge faces, said shoes having their side edges cut away on one corresponding side of each shoe to provide clearance for the corresponding lugs of the wedge when said wedge is rotated to an extent to clear the lugs of the casing; and spring means within the casing opposing inward movement of the shoes.

6. In a friction shock absorbing mechanism, the combination with a friction casing open at the front end and having three V-shaped interior friction surfaces at said front end arranged symmetrically about the longitudinal central axis of the casing, said casing having inturned retaining lugs at said front end alternated with said friction surfaces; of a friction shoe cooperating with each of said V-shaped casing surfaces, each shoe having a wedge face on its inner side; a wedge block having wedge faces respectively engaging said shoe wedge faces, said block having radially outwardly projecting retaining lugs extending between adjacent shoes and cooperating with said casing lugs to limit outward movement of the block; and means within the casing yieldingly opposing inward movement of the shoes.

7. In a friction shock absorbing mechanism, the combination with a friction casing open at the front end, said casing having longitudinally extending interior friction surfaces at said front end, said casing having inturned retaining lugs at said front end alternated with said friction surfaces; of a plurality of friction shoes cooperating with said friction surfaces, said shoes corresponding in number to said friction surfaces; a wedge block between said shoes having wedging engagement therewith, said wedge block having radially outwardly extending retaining lugs extending between adjacent shoes and engaging with the lugs of the casing to limit outward movement of the wedge, each shoe having one side edge thereof cut away at the forward end thereof, said cut-away portions being on corresponding sides of the shoes and providing clearance for the lugs of said wedge in assembling the wedge with the other parts of the mechanism when said shoes are displaced inwardly to a predetermined extent and said wedge is rotatably displaced to bring said lugs in alignment with said cut-away portions of the shoes and clear of the lugs of the casing; and means within the casing yieldingly opposing inward movement of the shoes.

GEORGE E. DATH.